(12) United States Patent
Park et al.

(10) Patent No.: US 8,384,389 B2
(45) Date of Patent: Feb. 26, 2013

(54) METHOD OF MONITORING BEHAVIOR OF CARBON DIOXIDE IN POROUS AQUIFER BY USING MARINE CONTROLLED-SOURCES ELECTROMAGNETIC SURVEY

(75) Inventors: Sam Gyu Park, Daejeon (KR); Yutaka Sasaki, Kasuya-gun (KR); Sung Joon Cho, Daejeon (KR)

(73) Assignee: Korea Institute of Geoscience and Mineral Resources (KIGAM) (KR)

( * ) Notice: Subject to any disclaimer, the term of this patent is extended or adjusted under 35 U.S.C. 154(b) by 314 days.

(21) Appl. No.: 12/914,606

(22) Filed: Oct. 28, 2010

(65) Prior Publication Data

US 2011/0227576 A1 Sep. 22, 2011

(30) Foreign Application Priority Data

Mar. 17, 2010 (KR) .................. 10-2010-0023976

(51) Int. Cl.
*G01V 3/12* (2006.01)

(52) U.S. Cl. ................. 324/332; 324/334; 324/337

(58) Field of Classification Search .............. 324/332, 324/334, 337
See application file for complete search history.

(56) References Cited

PUBLICATIONS

Ziqiu Xue et al., "Laboratory study of CO2 migration in water-saturated anisotropic sandstone, based on P-wave velocity imaging," Exploration Geophysics, 2006, vol. 37, pp. 10-18.
Ziqiu Xue et al., "Estimation of CO2 saturation from time-lapse CO2 well logging in an onshore aquifer, Nagaoka, Japan," Exploration Geophysics, vol. 37, 2006, pp. 19-29.
Hideki Saito et al., "Time-lapse crosswell seismic tomography for monitoring injected CO2 in an onshore aquifer, Nagaoka, Japan," Exploration Geophysics, vol. 37, 2006, pp. 30-36.
Don Sherlock et al., "Gravity monitoring of CO2 storage in a depleted gas field: A sensitivity study," Exploration Geophysics, vol. 37, 2006, pp. 37-43.
Andrea Forster et al., "Baseline characterization of the CO2SINK geological storage site at Ketzin, Germany," Environmental Geosciences, vol. 13, No. 3, Sep. 2006, pp. 145-161.
R.A. Chadwick et al., "Latest time-lapse seismic data from Sleipner yield new insights into CO2 plume development," Energy Procedia, vol. 1, 2009, pp. 2103-2110.

*Primary Examiner* — Reena Aurora
(74) *Attorney, Agent, or Firm* — Cantor Colburn LLP

(57) ABSTRACT

A method of monitoring a behavior of carbon dioxide in a stratum by using a marine Controlled-Sources Electromagnetic survey, includes: (S10) collecting a sample of sandstone at a stratum for charging carbon dioxide; (S20) calculating an effective porosity of the collected sample; (S30) measuring an electrical resistivity by saturating the collected rock sample with a pore fluid having a different concentration; (S40) forecasting a change of an electrical resistivity of stratum by charging carbon dioxide; (S50) carrying out a Marine CSEM exploration before and after charging the carbon dioxide separately in each step; and (S60) monitoring a charging behavior of carbon dioxide in stratum by a Marine CSEM exploration.

4 Claims, 14 Drawing Sheets

Resistivity measurement system

Specimen holder

B2-1 sandstone sample

B2-2 sandstone sample

B4-1 sandstone sample

METHOD OF MONITORING BEHAVIOR OF CARBON DIOXIDE IN POROUS AQUIFER BY USING MARINE CONTROLLED-SOURCES ELECTROMAGNETIC SURVEY

BACKGROUND OF THE INVENTION

1. Field of the Invention

The present invention relates to a method of monitoring the behavior of carbon dioxide put into a layer of submarine sandstone by using the marine Controlled-Sources Electromagnetic ("CSEM") survey. More particularly, the present invention relates to a method of monitoring the behavior of carbon dioxide in a layer of sandstone by analyzing a value of marine CSEM and using the variation in the amplitude of an electric field and the phase difference before and after charging carbon dioxide, when arising an electrical resistivity with charging carbon dioxide into a layer of sandstone which is saturated with salt water. According to the present invention, Archie's empirical formula can be induced by measuring an electrical resistivity after saturating a sandstone taken from a subterranean level submarine with various solutions having different NaCl concentrations, and then an empirical formula can be established, which can be used for the calculation of an electrical resistivity according to an amount of carbon dioxide charged into a layer of sandstone. Also, according to the present invention, a simple geological stratum model can be established, which includes a porous sandstone suitable for storing carbon dioxide under the ground and shale of an impermeable layer which covers the sandstone layer, and to calculate an inputting value of an electrical resistivity for a layer of sandstone according to an amount of carbon dioxide put into a layer of sandstone.

2. Description of the Prior Art

In storing $CO_2$ under the ground to reduce a greenhouse gas, it is important to develop a technique of monitoring the behavior of $CO_2$. At laboratory and pilot site the electrical resistivity and the seismic wave velocity are being used. However, there has been no proposed monitoring technique or monitoring method in relation to the storing of $CO_2$ under the marine ground, other then the seismic survey.

Considering the characteristics of stratum and a geological structure of the pilot site for storing $CO_2$ under the ground located at the district of Nagaoka, Japan and Ketzin, Germany, the layer of sandstone which is an object for charging $CO_2$ has a porosity above 20%, and this layer is covered with a shale having a low permeability so that it has a geological condition which does not leak $CO_2$ after charging (Andrea Forster et al., 2006; Xue, et al., 2006). Korean continental shelf has similar characteristics of stratum and geological structure with the above-mentioned district. Thus, there is a possibility for storing $CO_2$ under the ground through analyzing a data of geophysical surveys and drilling search for the Korean continental shelf.

To make a practical technique for storing $CO_2$ under the ground, above all, it should be able to measure a storing potential and a behavior of $CO_2$ charged under the ground. Various experiments at a pilot site and lab experiments have been carried out to the purpose mentioned above.

Indoor experiment may be carried out by monitoring the behavior and the charged amount by using an increase of electrical resistivity and a reduction of seismic wave velocity according to the charged amount of carbon dioxide through measurement of electrical resistivity and seismic wave velocity at the time before and after charging carbon dioxide into a layer of sandstone (Onishi, et al., 2006; Xue and Lei, 2006). Also, experiment at pilot site may be carried out by monitoring the behavior of $CO_2$ under the ground by using either seismic wave tomography survey, or various monitoring technique for exploration such as gravity prospecting and well logging (Xue, et al., 2006; Saito et al., 2006; Sherlock et al., 2006).

Among these methods for exploration, the tomography survey which uses a seismic wave and an electrical resistivity is proposed as useful method in analyzing the behavior of $CO_2$ under the ground due to its high solution capacity for a result of exploration, even though there is a difficulty in using an exploratory hole.

Since the approach for the method of an electrical resistivity and a seismic wave tomography survey is not easy in storing $CO_2$ under the marine ground, the example using marine seismic survey has been reported (Chadwick, et al., 2009). However, seismic survey has a drawback in that it is difficult to measure a charged amount quantitatively because velocity reduction is not incurred corresponding to the increase of a charged $CO_2$ amount, even though it is advantageous for analyzing a charging range with inducing a large reduction of velocity before and after charging carbon dioxide.

On the other hand, since an electrical resistivity is continuously increased either at the time before and after charging carbon dioxide, or upon to increase of a charged amount so that it is easy to measure a charging range of $CO_2$ as well as a charged amount quantitatively, it is necessary to review the adaptability of Marine CSEM.

SUMMARY OF THE INVENTION

Accordingly, the present invention has been made to solve the above-mentioned problems occurring in the prior art, and an object of the present invention is to provide a method of monitoring the behavior of carbon dioxide after the carbon dioxide is charged into the layer of sandstone distributed at the bottom of the sea.

Porosity and an electrical resistivity of pore fluid can be mentioned as a principle element which affects an electrical resistivity in a case of a porous layer of sandstone which is being saturated in salt water. Among these elements, once an electrical resistivity of pore fluid is varied, an electrical resistivity of stratum is also varied.

The layer of porous sandstone is noticed as the most ideal stratum for storing $CO_2$ under the ground, and most of the layer is an aquifer of salt water. Further, an electrical resistivity of pore fluid of the stratum is low to an extent that it is equal to that of seawater.

Such stratum has a high porosity and a high electrical conductivity of pore fluid so that it has a relative low electrical resistivity of several ohm-m. Therefore, an electrical resistivity of stratum becomes higher because a portion of pore fluid is replaced with $CO_2$, when $CO_2$ of supercritical state is input into the stratum.

It has been known that, according to the result of an indoor $CO_2$ charging experiment using a porous sandstone, $CO_2$ is filled in a gap up to a extent of 50~60%. Also, it can be expected that the greater the amount of charged $CO_2$, the higher an electrical resistivity of stratum because electrical conductivity of $CO_2$ at supercritical state or liquid state is lower than that of salt water.

The present invention is contrived to achieve the purpose, more particularly, to measure an electrical resistivity by using a sample of rock collected at a marine stratum for charging $CO_2$, and calculate an electrical resistivity of a stratum according to the charged amount of $CO_2$ from Archie's empirical formula by using the result. Next, the present invention also provides a method of monitoring the behavior of $CO_2$, which includes the steps of installing a transmitter and a receiver for a Marine CSEM exploration at the bottom of the marine stratum for charging $CO_2$, and carrying out a Marine CSEM exploration before and after charging $CO_2$ repeatedly, and then assaying a charging range of $CO_2$ by calculating the rate of change for the amplitude of electric field and a phase difference depending upon a charged amount of $CO_2$

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
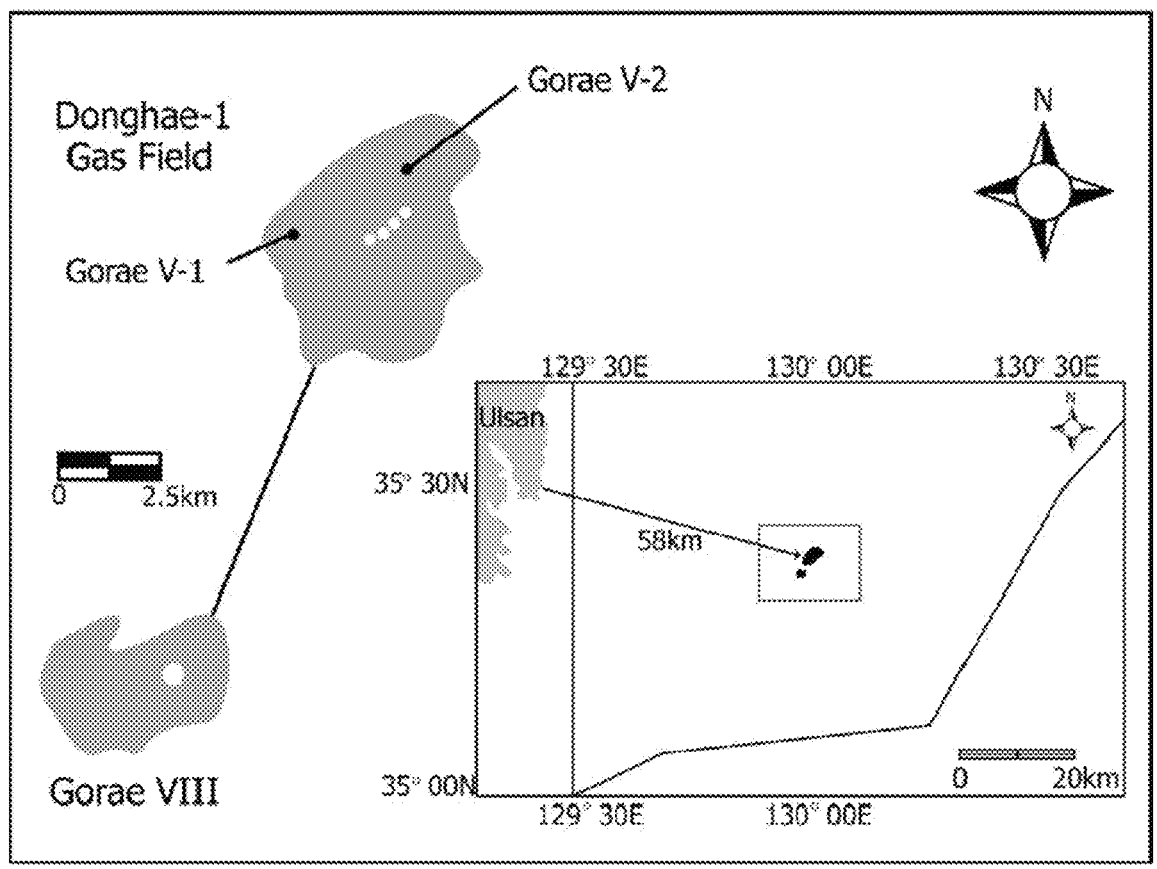
FIG. 1 illustrates a location which a sample of porous sandstone at the bottom of the sea is collected.

Hereinafter, a preferred embodiment of the present invention will be described with reference to the accompanying drawings. In the following description and drawings, the same reference numerals are used to designate the same or similar components, and so repetition of the description on the same or similar components will be omitted.

The present invention verifies the feasibility of carrying out a numerical analysis of Marine CSEM. To achieve this purpose, an electrical resistivity is measured for sample porous sandstones collected at a marine stratum for charging carbon dioxide. By using the result, an electrical resistivity of the layer of porous sandstone according to the charged amount of carbon dioxide is calculated from Archie's empirical formula. Also, the present invention discloses a method, in which the stratum model is set with simplifying a geological stratum, an object for charging $CO_2$, the numerical analysis by Marine CSEM is carried out by using an electrical resistivity of aquifer depending upon a charged amount of $CO_2$ with an inputting data, and then the amplitude of electric field and a phase difference depending upon a charged amount of $CO_2$ are calculated from the result, so as to monitor the charging behavior of $CO_2$ in the layer of sandstone.

In a case of a layer of sandstone which is being saturated with salt water, porosity and an electrical resistivity of pore-fluid can be described as principle elements which affect an electrical resistivity of the layer of sandstone. Among these elements, once an electrical resistivity of pore-fluid is varied, an electrical resistivity of the stratum including the sandstone layer is also varied. The most ideal condition of geological features and stratum for storing $CO_2$ under the ground is an anticline structure, which includes a layer of sandstone having a large porosity and a layer of shale covering the sandstone layer as a covering rock.

Such an aquifer of salt water has a high porosity and a high electrical conductivity of pore-fluid so that it has a relative low electrical resistivity of several ohm-m. Therefore, an electrical resistivity of stratum becomes higher because a portion of pore fluid is replaced with $CO_2$, when $CO_2$ of supercritical state is input into the stratum.

It has been known that, according to the result of $CO_2$ charging experiments using a sandstone at laboratories, $CO_2$ is filled in a gap up to an extent of 50%. As the amount of charged $CO_2$ increases, the electrical resistivity of stratum become higher because the electrical conductivity of $CO_2$ at supercritical state or liquid state is lower than that of salt water.

In the storage of $CO_2$ under the marine ground, the behavior of the charged $CO_2$ should be monitored.

According to an embodiment of the present invention, the charging range and behavior of the charged $CO_2$ can be measured by carrying out an exploration with a Marine CSEM before and after charging $CO_2$ repeatedly because the electrical resistivity is changed at a charged area when $CO_2$ is charged into the aquifer of salt water.

A method according to the present invention includes the steps of: collecting a sample of sandstone at a stratum where carbon dioxide is to be charged (S10); calculating an effective porosity of the sample of sandstone (S20); measuring an electrical resistivity after saturating the sample of sandstone with pore-fluid having different concentrations (S30); forecasting a change of an electrical resistivity of the stratum by charging carbon dioxide (S40); carrying out a Marine CSEM exploration before and after charging the carbon dioxide separately at each step (S50); and monitoring the charging behavior of carbon dioxide in the stratum by a Marine CSEM (S60).

Each step of the method is further described hereinafter.

Step of Collecting a Sample of Sandstone (S10)

Hereinafter, a step of measuring an electrical resistivity by using a sample of sandstone collected from a stratum being charged with carbon dioxide will be described.

Figure 2:
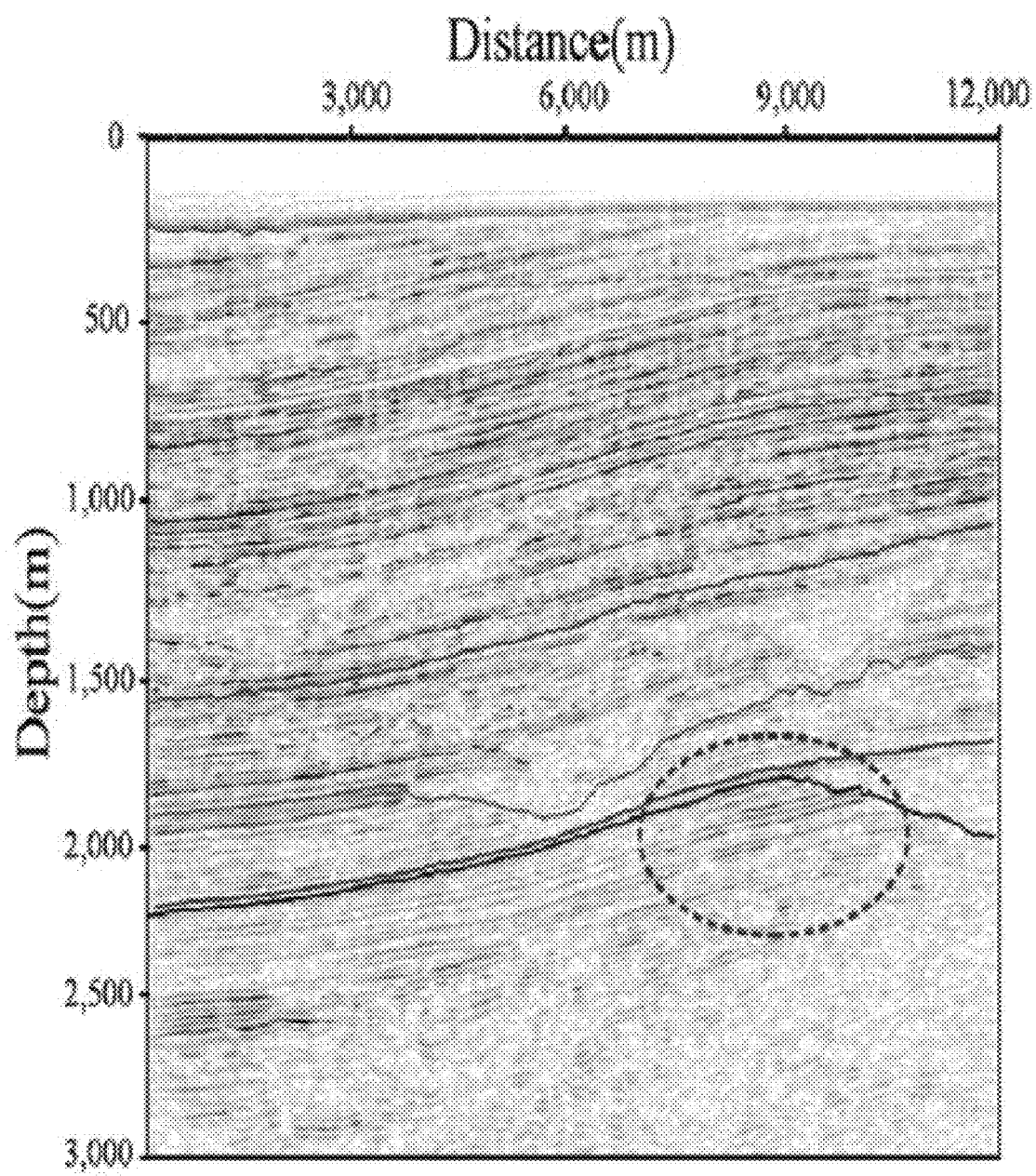
FIG. 2 is a cross section which represents a final polymerized state using data of a seismic wave exploration of a location which a sample of sandstone is collected.

FIG. 1 represents a location from which specimen of porous sandstone at the bottom of the sea is collected, and FIG. 2 is a cross section which represents a final polymerized state using a data of a seismic wave exploration of a location which a porous sandstone specimen is collected. In the FIG. 2, a dotted line of an oval shape is an area of gas undertow layer and a location which a sample of sandstone is collected. A geologic time of undertow layer is Mid-Miocene, and it is the layer of sandstone including a small quantity of shale.

Velocity of seismic wave, poisson's ratio and density according to result of geophysical well logging is represented at table 1.

TABLE 1

Geophysical properties of sampled stratum.

| stratum | depth (m) | Vp (m/s) | Vs (m/s) | Poisson' ratio | density (g/cm³) |
|---|---|---|---|---|---|
| B2 | 2235 | 3330 | 1960 | 0.235 | 2.300 |
| B4 | 2270 | 3330 | 2050 | 0.195 | 2.300 |

Step of Calculating an Effective Porosity (S20)

The collected specimen is shaped to terete, and an effective porosity ($\phi$) is calculated from Equation (1) as defined below.

$$\phi = (W_a - W_d)/(W_a - W_w) \quad (1)$$

In Equation (1), $W_a$ and $W_w$ are weight (g) of the specimen in the atmosphere and underwater respectively, after the specimen which is the shaped sample of rock is forcibly wetted for over 72 hours by a vacuum pump by compulsion, $W_d$ is weight after the specimen is dried for over 72 hours in a drying oven. Table 2 below shows a size and an effective porosity of a sample which is collected from a stratum for storing carbon dioxide under the ground. Its effective porosity is in a range of about 15~about 18%.

TABLE 2

Descriptions of samples

| Sample | length (mm) | diameter (mm) | porosity (%) |
|---|---|---|---|
| B2-1 | 108.56 | 53.49 | 18.50 |
| B2-2-C | 104.22 | 52.61 | 18.04 |
| B4-3-C | 101.85 | 52.23 | 15.49 |

Step of Measuring an Electrical Resistivity (S30)

Figure 3A:
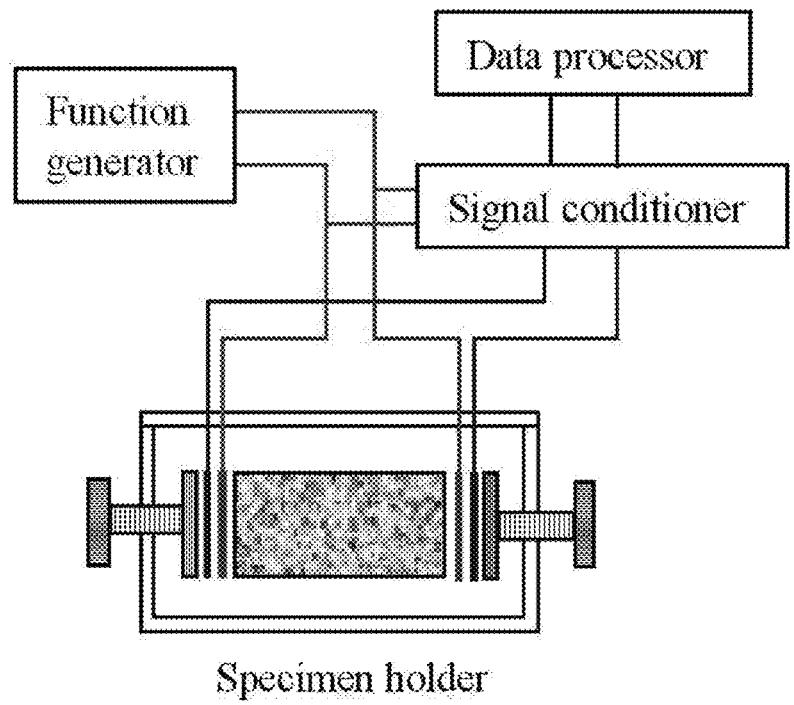
FIGS. 3A and 3B are schematic views of an instrument for measuring an electrical resistivity.

In order to measure an electrical resistivity of a rock sample, a measuring system of electrical resistivity such as FIG. 3A may be used.

The measuring system includes a function generator to flow an electric current, a signal conditioner to measure a potential difference, a data processor to calculate an electrical resistivity from an electric current and a potential difference, and a measuring vessel.

Figure 3B:
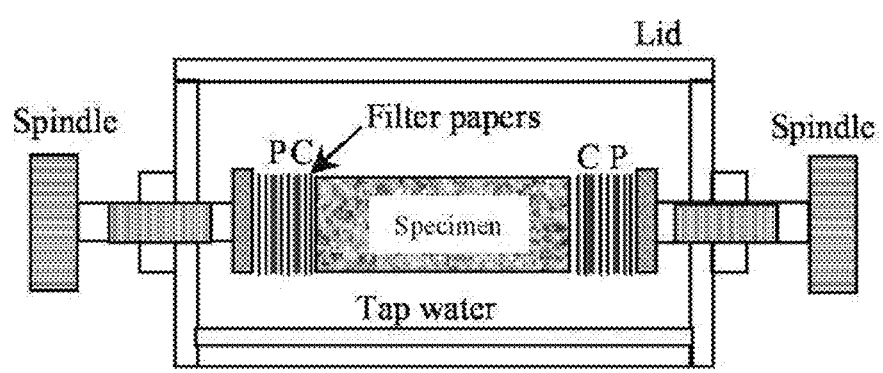

As noted from FIG. 3B, the measuring vessel of a rock sample is formed as a hexahedron by using an insulating acrylic material, and a specimen can be fixed by using spindles on both sides.

When measuring an electrical resistivity, a copper net of 80 meshes is used as an electric current and a potential electrode at both ends of a specimen, and a filter paper which is saturated in a solution of 0.1N NaCl is inserted between an electrode and a specimen.

Also, it is recommended to pour a small amount of water into a measuring vessel and close the lid so that it can be kept saturated with moisture in the atmosphere, in order to prevent a surface of the specimen from drying during the measuring of an electrical resistivity for a specimen.

An electrical resistivity can be calculated from Equation (2) defined below by measuring a potential difference from a potential electrode when an electric current flows parallel to an axis direction at both ends of a rock sample.

$$R = \frac{S}{L}\frac{\Delta V}{I} \quad (2)$$

In Equation (2), R represents an electrical resistivity (ohm-m) of a specimen, S represents cross section (cm²) of a specimen, L represents length (cm) of a specimen, I
Δ represents an electric current (A), and V represents a potential difference (V).

Table 3 below shows the results of measurement for an electrical resistivity with saturating porous sandstone which is collected from a stratum for storing carbon dioxide under the ground in a NaCl solution of three different concentrations.

TABLE 3

Resistivity changes of samples with different of the pore fluid resistivity

| Samples | Pore fluid resistivity (ohm-m) | Resistivity (ohm-m) | Porosity (%) |
|---|---|---|---|
| B2-1 | 0.314 | 4.26 | 18.50 |
| | 0.490 | 6.96 | |
| | 0.728 | 9.34 | |
| B2-2-C | 0.314 | 4.86 | 18.04 |
| | 0.490 | 7.93 | |
| | 0.728 | 10.78 | |
| B4-3-C | 0.314 | 4.70 | 15.49 |
| | 0.490 | 7.68 | |
| | 0.728 | 10.41 | |

The electrical resistivity of a rock sample may increase corresponding to the increase in the electrical resistivity of pore fluid. Then, even with an electrical resistivity of the same pore fluid, a rock sample having the larger effective porosity has the larger cubical contained water amount, which implies that the rock sample has a lower electrical resistivity.

Step of Forecasting a Change of an Electrical Resistivity (S40)

An electrical resistivity of porous sandstone is mainly influenced by porosity, a degree of saturation, an electrical resistivity of pore fluid and the like, and Archie's empirical formula (1942) is widely used. This empirical formula is to evaluate undertow capacity of porous sandstone, and is represented by the relation of an electrical resistivity R of stratum, an electrical resistivity $R_w$ of pore fluid, and a degree of saturation $S_w$ with Equation (3) defined below.

$$R = FR_w S_w^{-2} \quad (3)$$

In Equation (3), F is called a Formation factor, and is defined by Equation (4) below.

$$F = \frac{R}{R_w} = a\Phi^{-m} \quad (4)$$

In Equation (4), a is an experimental integer, and has a value of 0.6~3.5 empirically and, f is a porosity of stratum. m is cementation factor, and generally has a value of 1.4~2.2 while it is different according to a geological shape of a gap and a degree of cementation.

Archie's empirical formula has been widely used for calculating an amount of oil storage because it can measure a porosity of stratum provided that an electrical resistivity of pore fluid is known.

A cementation factor, m is can be obtained from Archie's empirical formula by using an electrical resistivity which is measured with saturating porous sandstone which is collected from a stratum for storing carbon dioxide under the ground in a NaCl solution of three different concentrations. An electrical conductivity of a rock can be obtained by using an electrical resistivity of a rock from Equations (3) and (4) with the reciprocal, and $S_w$ becomes 1 since a rock sample is a state saturated with NaCl solution.

Therefore, the relation between an electrical conductivity of a rock sample (a) and an electrical conductivity of pore fluid ($\sigma_w$) can be represented as Equation (5) below.

$$\sigma = \sigma_w \frac{X}{F} + Y \quad (5)$$

In Equation (5), X and Y are variables depending on a geological shape of a gap, an amount of contained clay, activity of an ion and the like.

Figure 4A:
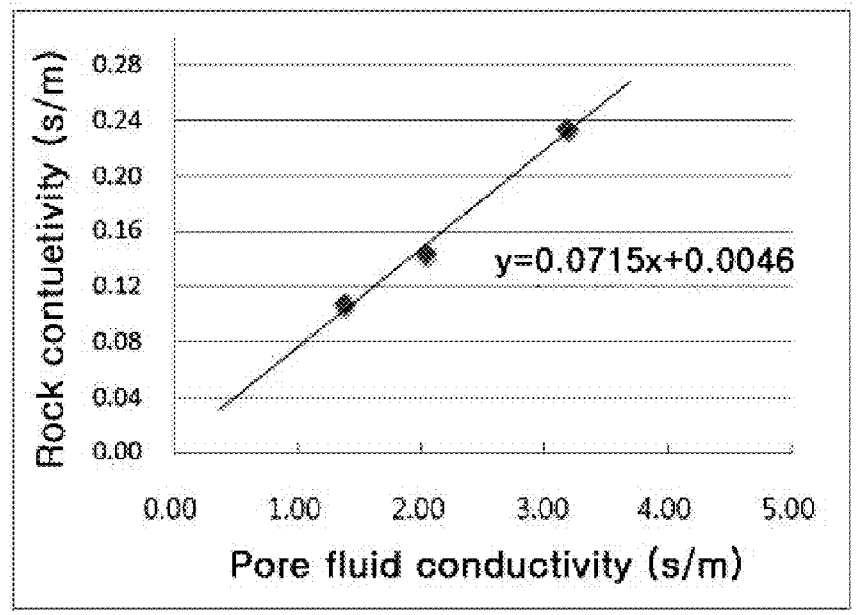
FIG. 4A to 4C illustrate correlation of an electrical conductivity between a rock and a pore fluid regarding a sample of sandstone.
Figure 4B:
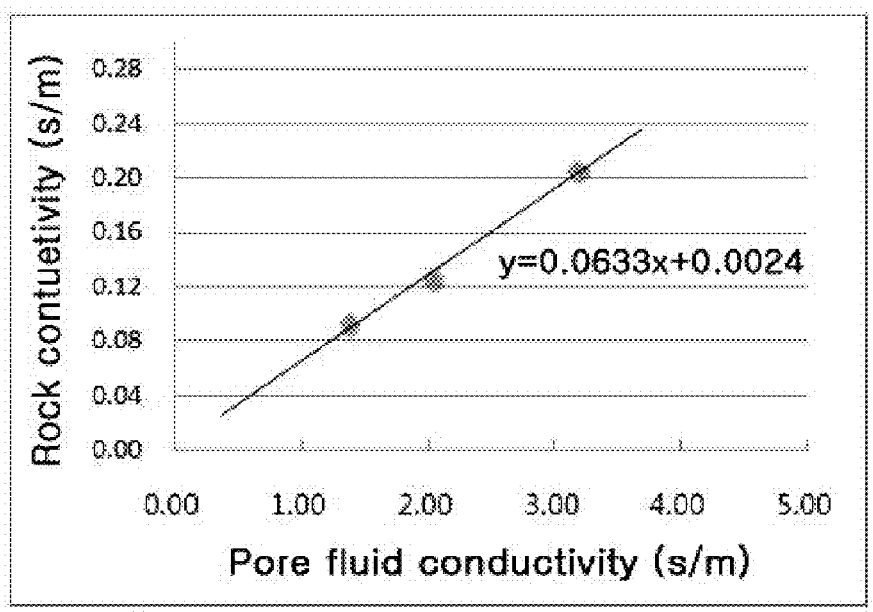
Figure 4C:
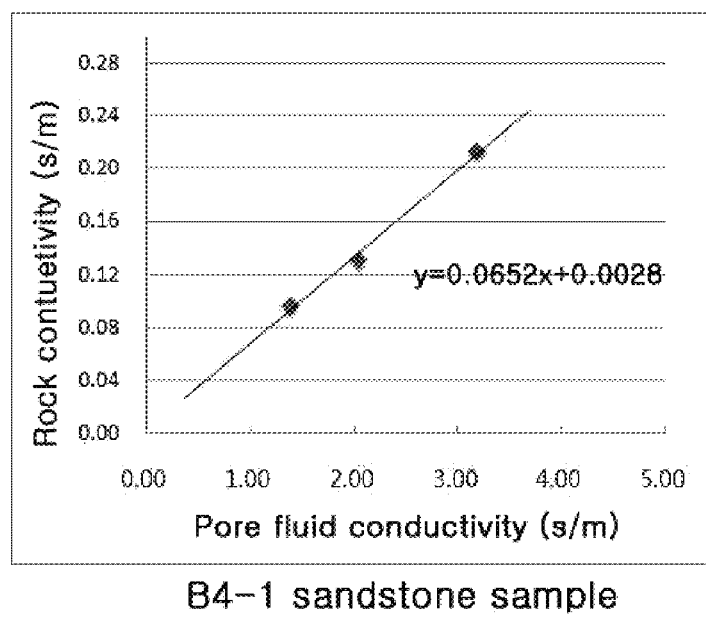

FIG. 4A to 4C are graphs that represent the correlation of an electrical conductivity between a rock and a pore fluid from a result of measurement for an electrical resistivity with saturating porous sandstone in a NaCl solution of three different concentrations. From this graph, it can be noted that, in a case of porous sandstone of a saturated state, a conductivity of a rock sample is mainly varied by a conductivity of pore fluid.

The first regression equation was obtained from the above mentioned correlation, and a cementation factor, m of Archie's empirical formula was calculated from its intercept. The cementation factors, m of a rock sample, B2-1, B2-2-C and B4-3-C were 1.563, 1.612, and 1.464, respectively.

Table 4 shows an electrical resistivity of stratum at degrees of $CO_2$ saturation, 0%, 30%, and 50% with regard to a sample of sandstone which is an object to which carbon dioxide is charged. A variation of an electrical resistivity of charged stratum can be expected with measurement of an electrical resistivity with saturating a rock sample that is a stratum for charging carbon dioxide in solution having different concentrations indoor.

dioxide under the ground according to FIG. 2, and shale of an impermeable layer exists on a layer of sandstone as a covering rock. In this stratum model, the layer of sandstone was an object for charging $CO_2$, and a charging area was determined with a predetermined area, and then variation of an electrical resistivity for a layer of sandstone was calculated from Archie's empirical formula according to an amount of charged $CO_2$.

Table 4 shows an inputting value of an electrical resistivity according to a degree of $CO_2$ saturation in a layer of sandstone which is calculated by using Archie's empirical formula based on a result of measurement for an electrical resistivity of B2-1 that is representative among the samples of sandstone collected from a stratum for storing carbon dioxide under the ground.

Phase 1 is a stage before $CO_2$ is charged into a layer of sandstone, which a gap of stratum is saturated with salt water so that, based on a measuring value for an indoor electrical resistivity, shale, a covering rock was set with 1 ohm-m and a layer of sandstone was set with 4.26 ohm-m.

Phase 2 and 3 are stages assuming that when $CO_2$ is charged into a gap of a layer of sandstone with 30% and 50% respectively, in which an electrical resistivity of a charging area was set with 8.68 ohm-m and 17.02 ohm-m as an inputting data respectively which was calculated from Archie's empirical formula.

For a simple geological stratum model, the Marine CSEM numerical analysis for each phase was performed before and after charging $CO_2$.

The purpose of exploration for numerical analysis was determined at the upper portion of a layer of sandstone which $CO_2$ is inputted into, with a varying water depth of 700~1,300 m according to the slope of the sea floor. In the numerical analysis for a Marine CSEM, a transmitter and a receiver were disposed with an inline mode, an electric dipole source (Jx) of x direction was used as a transmitting source and a receiver was also deployed in the x direction according to the inline mode.

TABLE 4

Physical properties changes of the geological model with numerical stage

| Numerical stage | Electrical resistivity (ohm-m) | Constant a | Porosity | Cementation factor m | Degree of water saturation | n | Electrical resistivity of pore fluid (ohm-m) | Degree of carbon dioxide saturation |
|---|---|---|---|---|---|---|---|---|
| Phase 1 | 4.26 | 0.97 | 0.185 | 1.563 | 1.0 | 2 | 0.314 | 0.0 |
| Phase 2 | 8.68 | 0.97 | 0.185 | 1.563 | 0.7 | 2 | 0.314 | 0.3 |
| Phase 3 | 17.02 | 0.97 | 0.185 | 1.563 | 0.5 | 2 | 0.314 | 0.5 |

Step of Carrying Out a Marine CSEM Exploration (S50)

This step is to carry out a Marine CSEM exploration for the bottom of marine stratum for charging $CO_2$, and is consisted of installing a transmitter and a receiver for a Marine CSEM exploration at the bottom of marine stratum, based on positioning an area for charging $CO_2$ at the center, and carrying out a Marine CSEM exploration with the same conditions before and after charging $CO_2$ repeatedly. To achieve the purpose, a procedure for numerical analysis and the result are as follows.

Figure 5:
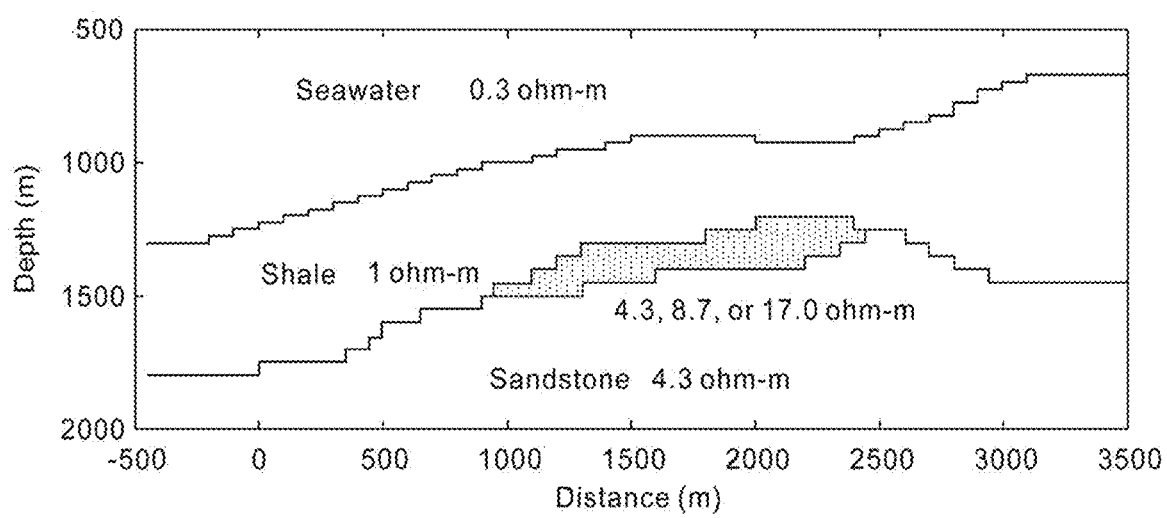
FIG. 5 illustrates a model of a simple two-layer geological structure of marine stratum for numerical analysis of a Marine CSEM.
Figure 6:
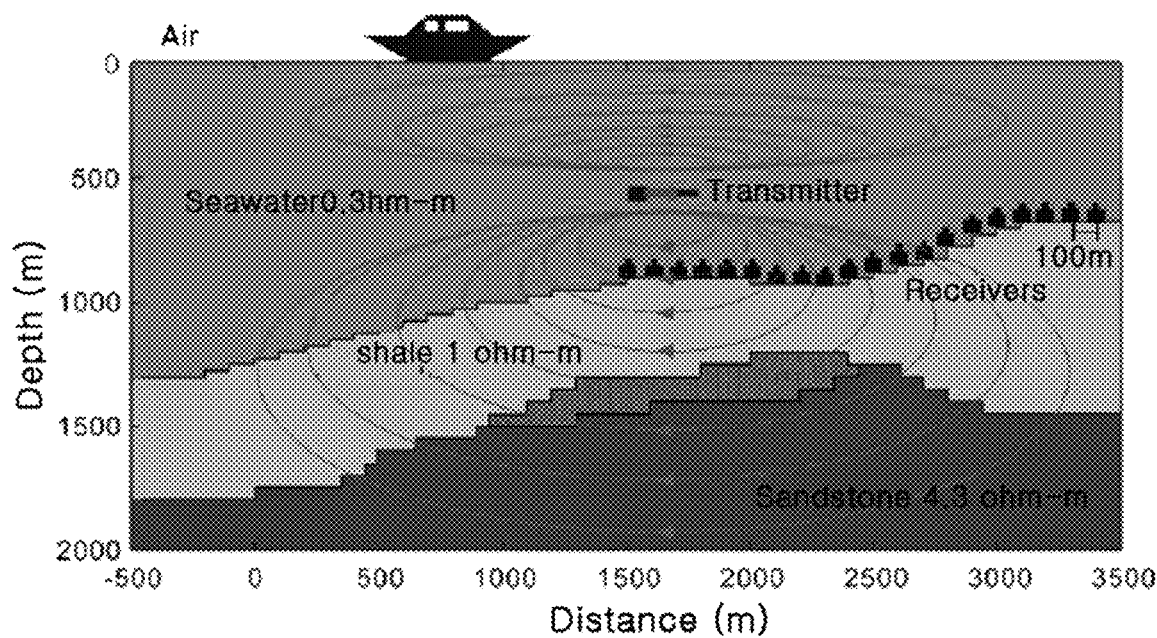
FIG. 6 is a schematic view of a Marine CSEM exploration.

A geological stratum model for numerical analysis of a Marin CSEM was set as shown in FIG. 5, which was simplified with a geological structure of two-layer based on the results of geophysical well logging and a seismic wave exploration of a location which is an object for storing carbon Also, a total of 37 receivers were installed at the sea floor with an interval of 100 m as shown in FIG. 6, and exploration was then carried out while pulling a transmitter on the state floated above 100 m from the sea floor. Data was obtained from the transmitters while staring at a distance of 50 m and moving with an interval of 200 m in the x direction, and the movement was repeated a total of 19 times.

3D staggered-grid finite-difference algorithm (Sasaki and Meju, 2009) was used for the Marine CSEM numerical analysis. The total area of the numerical analysis was formed with a total of 106×58×6 number of lattices in x, y and z directions, respectively. Wherein, each lattice near the sea floor was set to have a small size of 50×100×25 m, and each lattice near the boundary was set to have a large size of 3,200×3,200×3,200 m.

Step of Monitoring the Charging Behavior of Carbon Dioxide (S60)

FIG. 7A to 7D illustrate a result numerical analysis of a Marine CSEM before $CO_2$ is charged in the layer of sandstone and when it is 30% and 50% saturated, in a state in which 1.25 Hz of transmitting frequency is used in regard to the stratum model and a transmitter is positioned at a distance of 1,250 m from the x direction.

Figure 7A:
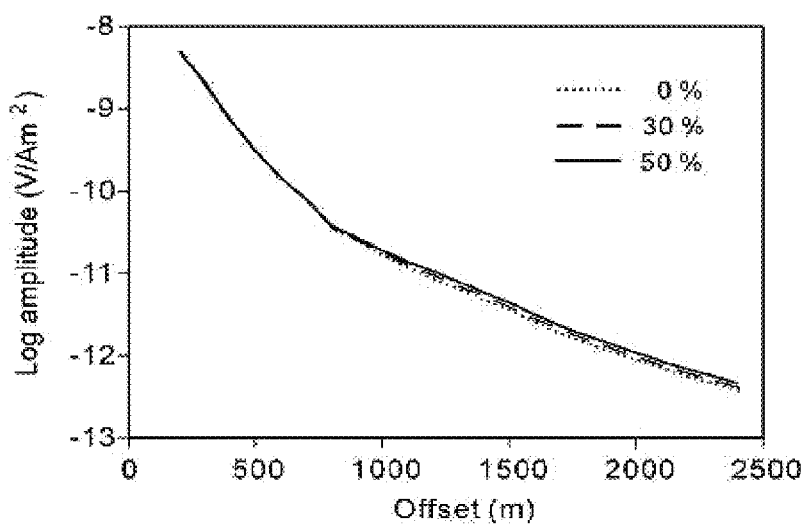
FIG. 7A to 7D illustrate a result of numerical analysis of a Marine CSEM before $CO_2$ is charged in the layer of sandstone and when it is saturated with 30%, and 50%.
Figure 7B:
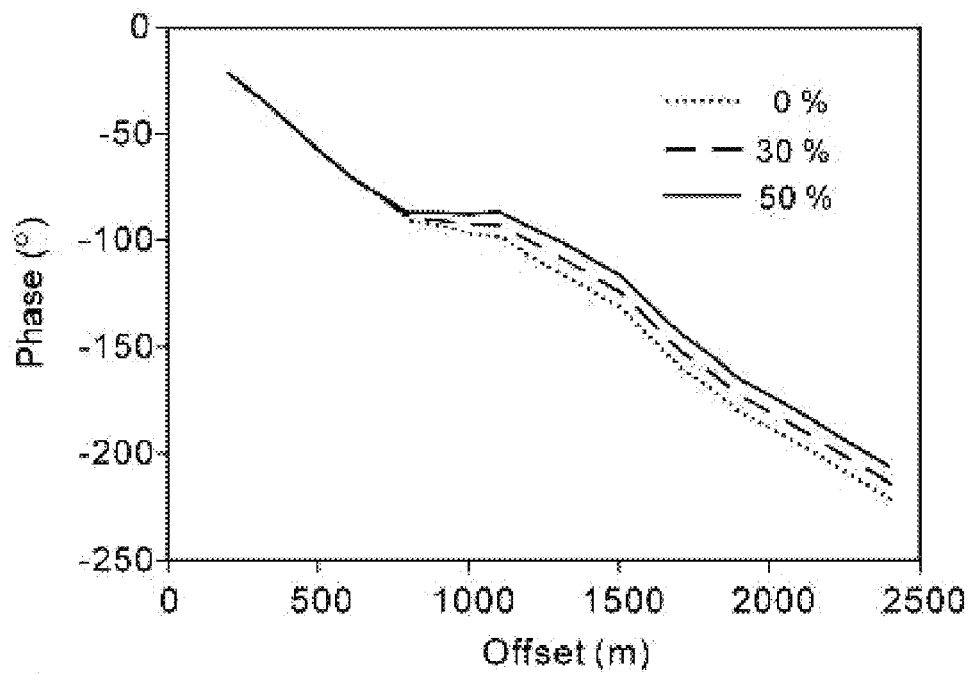

FIGS. 7A and 7B represent the amplitude and the phase about three stratum models in a case before and after $CO_2$ is charged.

Figure 7C:
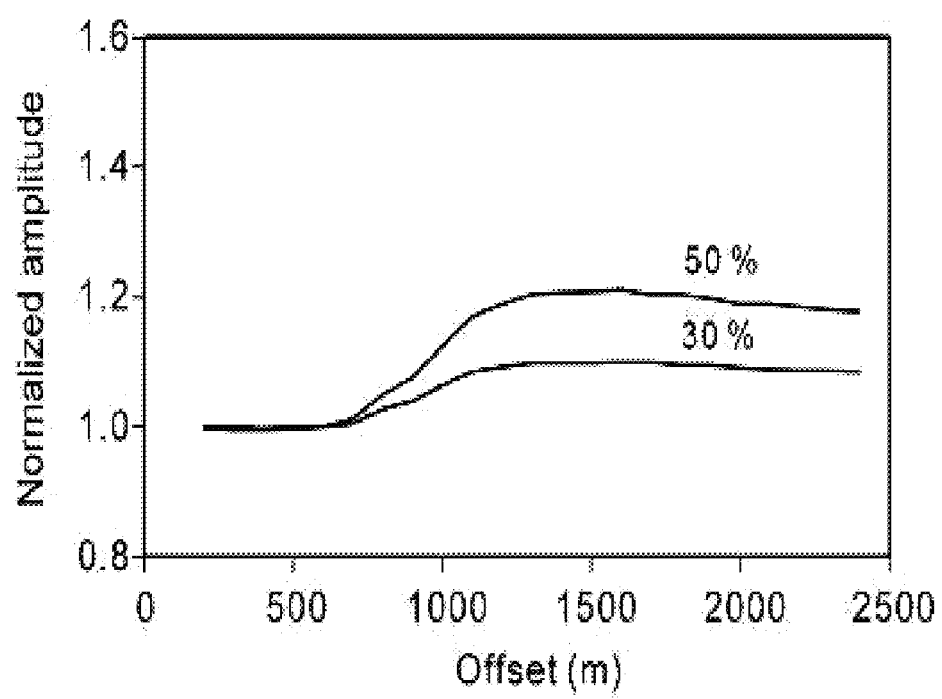
Figure 7D:
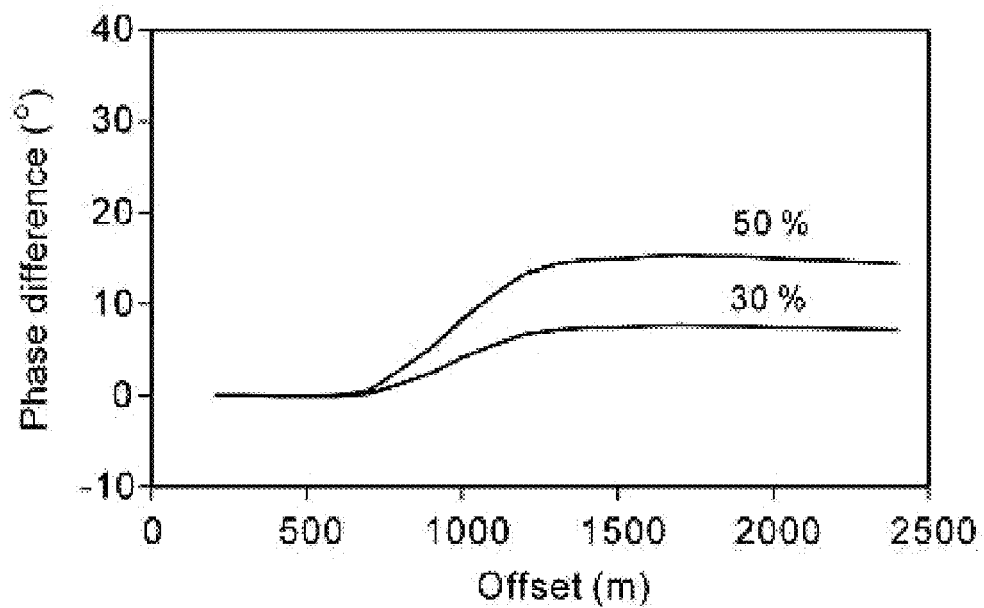
Figure 8A:
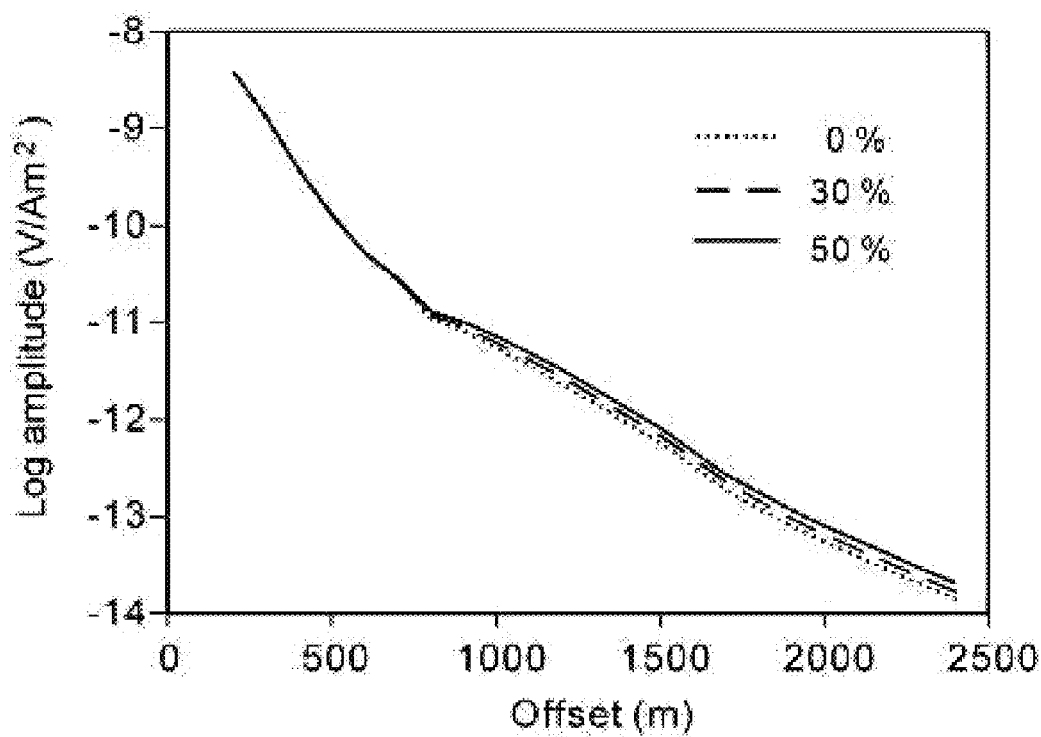
FIG. 8A to 8D illustrate a result at the same condition with FIG. 7 except that a transmitting frequency is changed to 4.25 Hz.
Figure 8B:
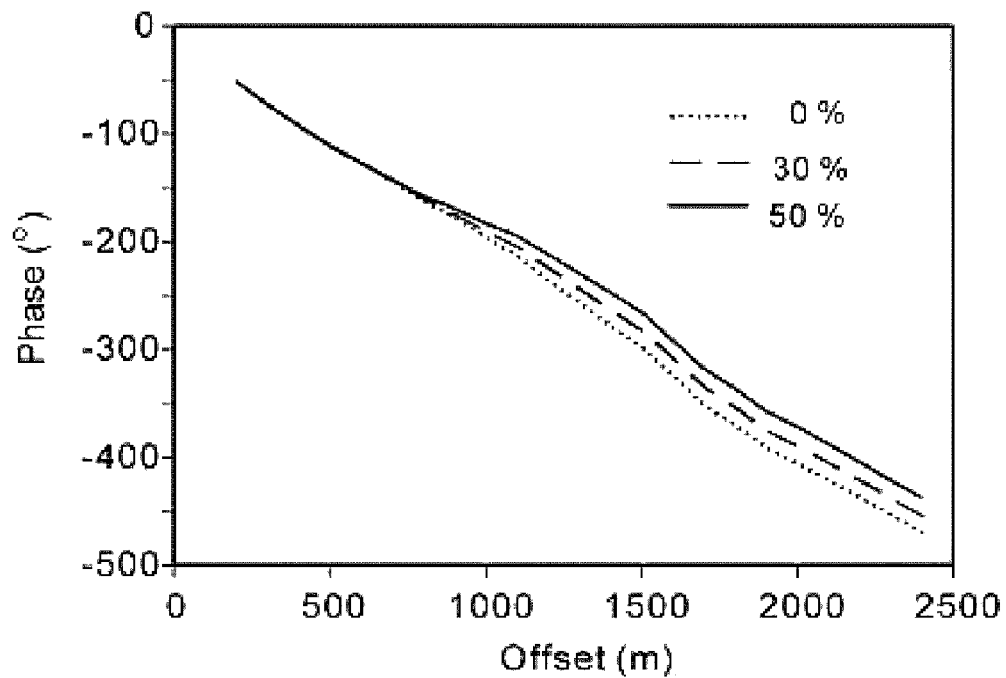
Figure 8C:
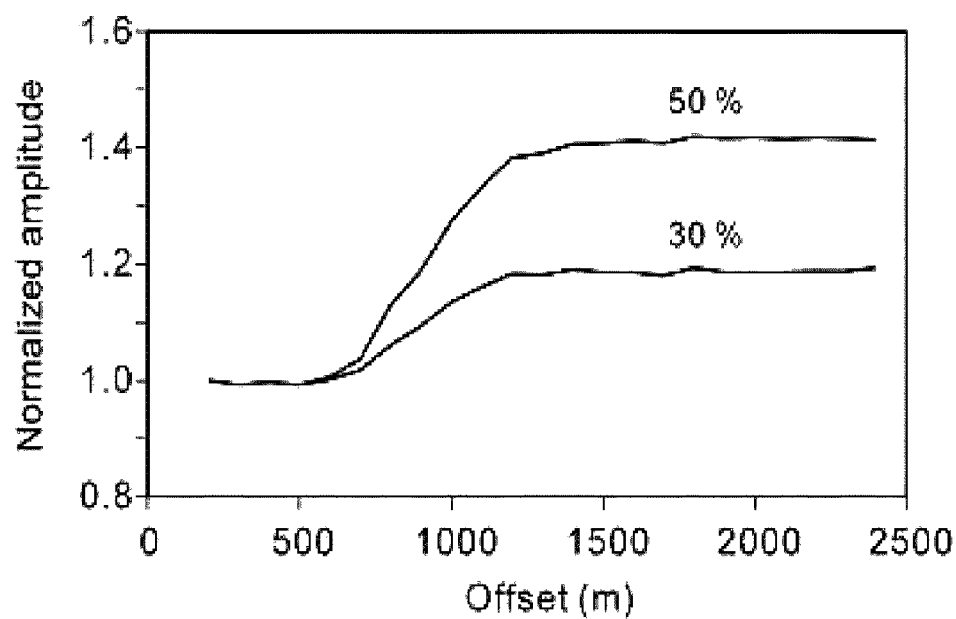
Figure 8D:
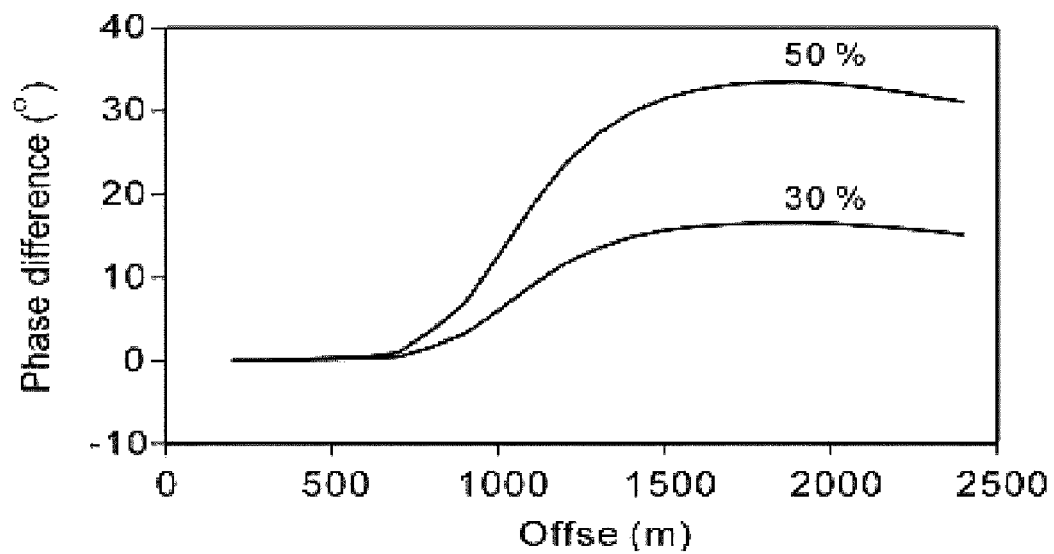

FIGS. 7C and 7D represent each the normalized amplitude and the phase difference when $CO_2$ is charged into a layer of sandstone at 30% and 50% with regard to the value before $CO_2$ is charged.

According to this Figure, when $CO_2$ is charged into a layer of sandstone at 30% and 50%, the amplitude and the phase difference are about 1.1-1.2 and about 8-15 respectively.

FIG. 8A to 8D are the case at the same conditions with FIG. 7A to 7D except that a transmitting frequency is changed to 4.25 Hz. Referring to the normalized amplitude and the phase difference at FIGS. 8C and 8D, it is noted that the amplitude and the phase difference are increased up to about 2 times more than the case that a transmitting frequency is 1.25 Hz at FIGS. 7C and 7D.

Figure 9A:
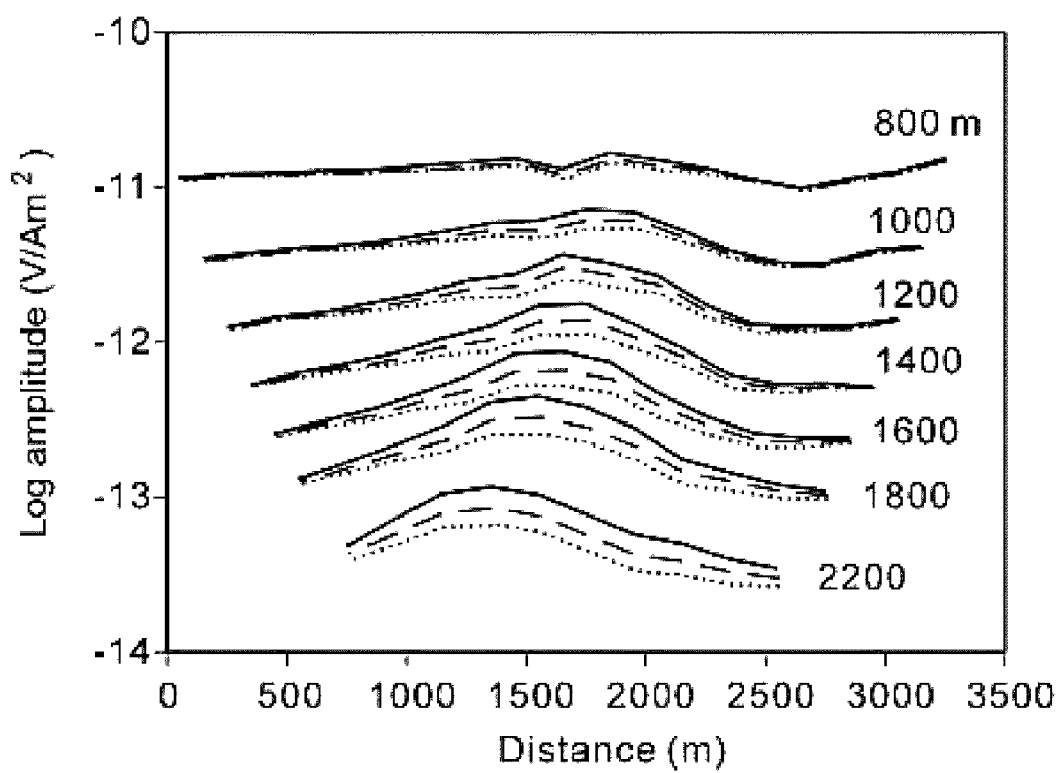
FIGS. 9A and 9B illustrate the amplitude and the phase of an electric field obtained by using 4.25 Hz of transmitting frequency about three stratum models in a case before $CO_2$ is charged in the layer of sandstone and when it is charged of 30%, and 50%, from 800 m of offset (the distance from a transmitter to a receiver) to 2,200 m.
Figure 9B:
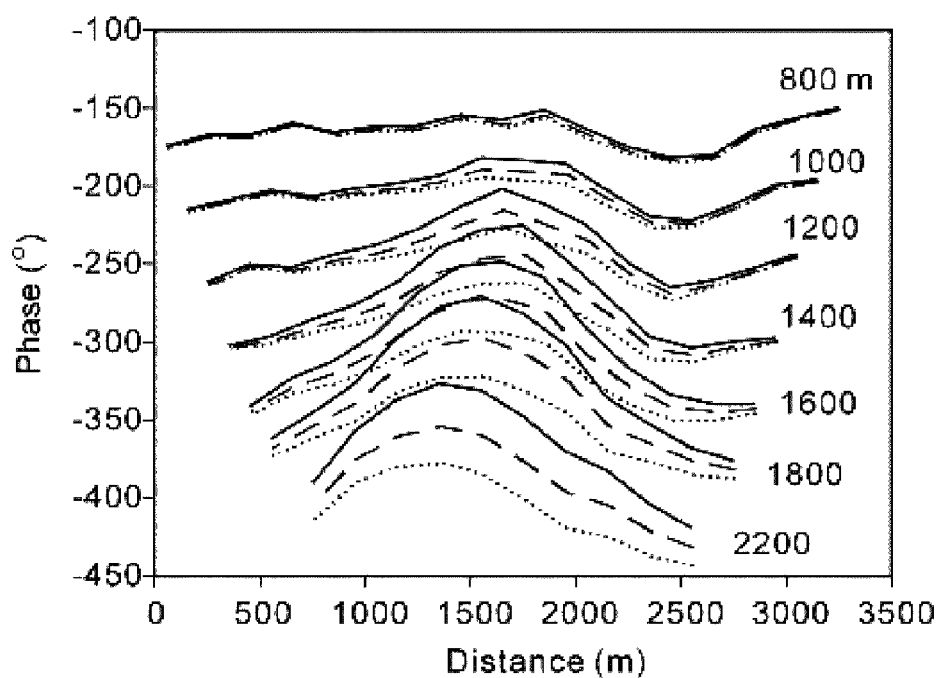

FIGS. 9A and 9B illustrate the amplitude and the phase obtained by using 4.25 Hz of transmitting frequency in three models in a case before $CO_2$ is charged in the layer of sandstone and when it is charged at 30%, and 50%, from a 800 m offset (the distance from a transmitter to a receiver) to 2,200 m, in order to visualize a result of a value construe for Marine CSEM.

Wherein, the amplitude and the phase data on the horizontal line are plotted from the central position of a transmitter/a receiver, a fine dotted line represents at the state before $CO_2$ is charged, and a thick dotted line and a solid line represent the states when $CO_2$ is charged at 30% and 50%, respectively. It is noted that these results are similar to data which has been represented for electrical prospecting being used on the ground, and the greater the offset, the higher the reaction of the amplitude and the phase according to $CO_2$ storage.

FIG. 10A to 10D illustrate the normalized amplitude and phase when $CO_2$ is charged at 30% and 50% with regard to before $CO_2$ is charged, in order to show more clearly a change of an electrical resistivity according to $CO_2$ charging from a result as shown in FIG. 9A to 9D.

Figure 10A:
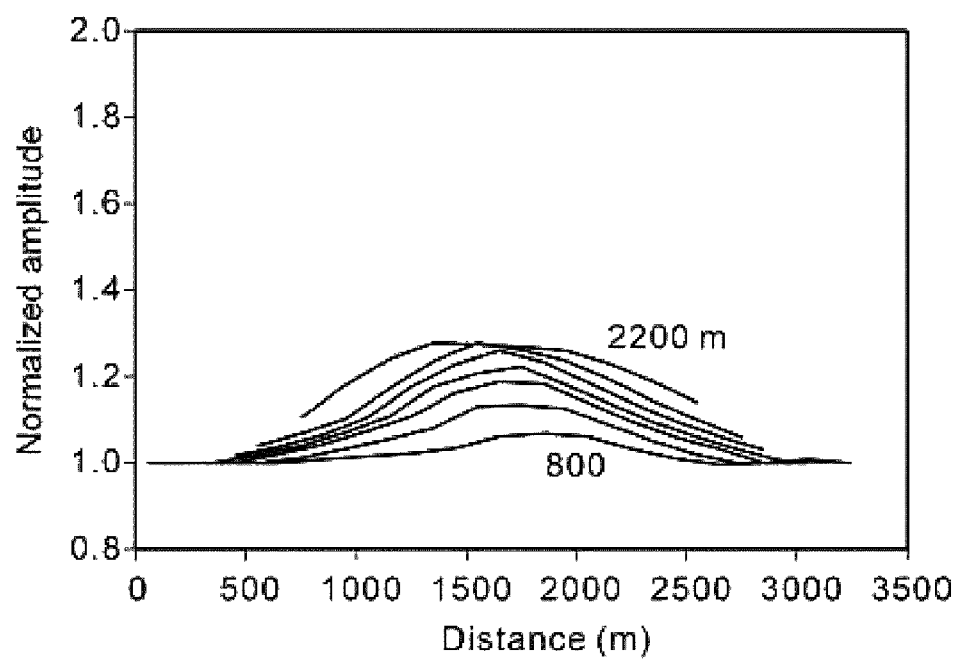
FIG. 10A to 10D illustrate a normalized amplitude and phase of an electric field from a result of FIGS. 9A and 9B when $CO_2$ is charged at 30% and 50% with regard to a amplitude and a phase of an electric field in case before $CO_2$ is charged.
Figure 10B:
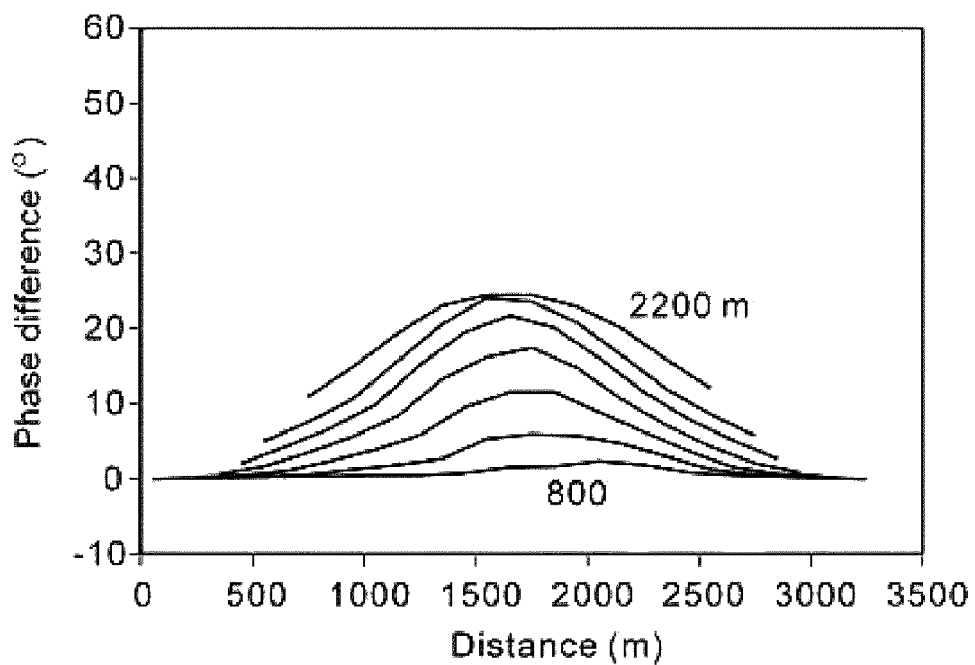
Figure 10C:
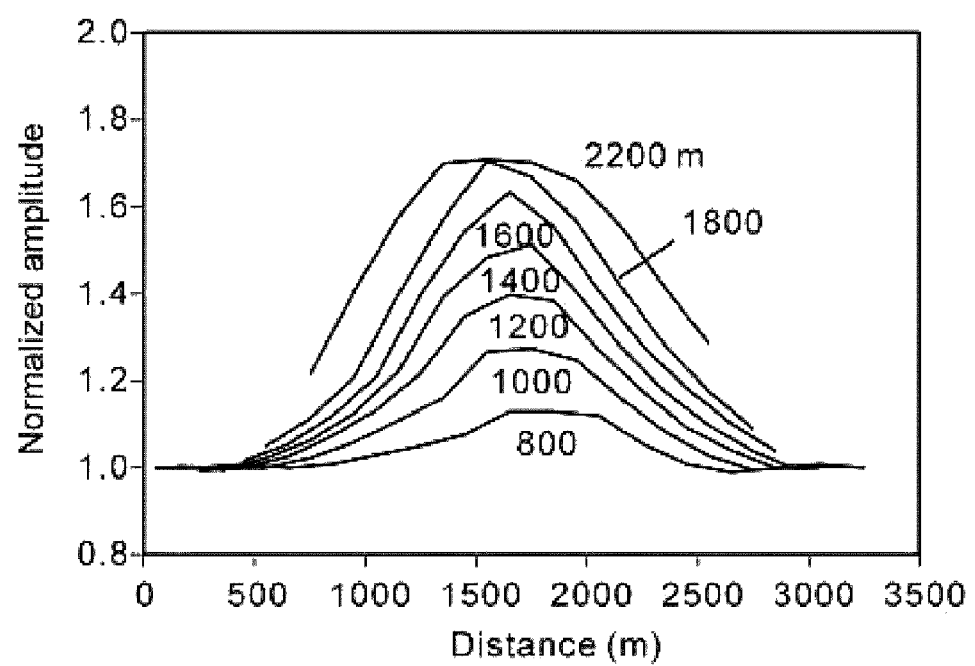
Figure 10D:
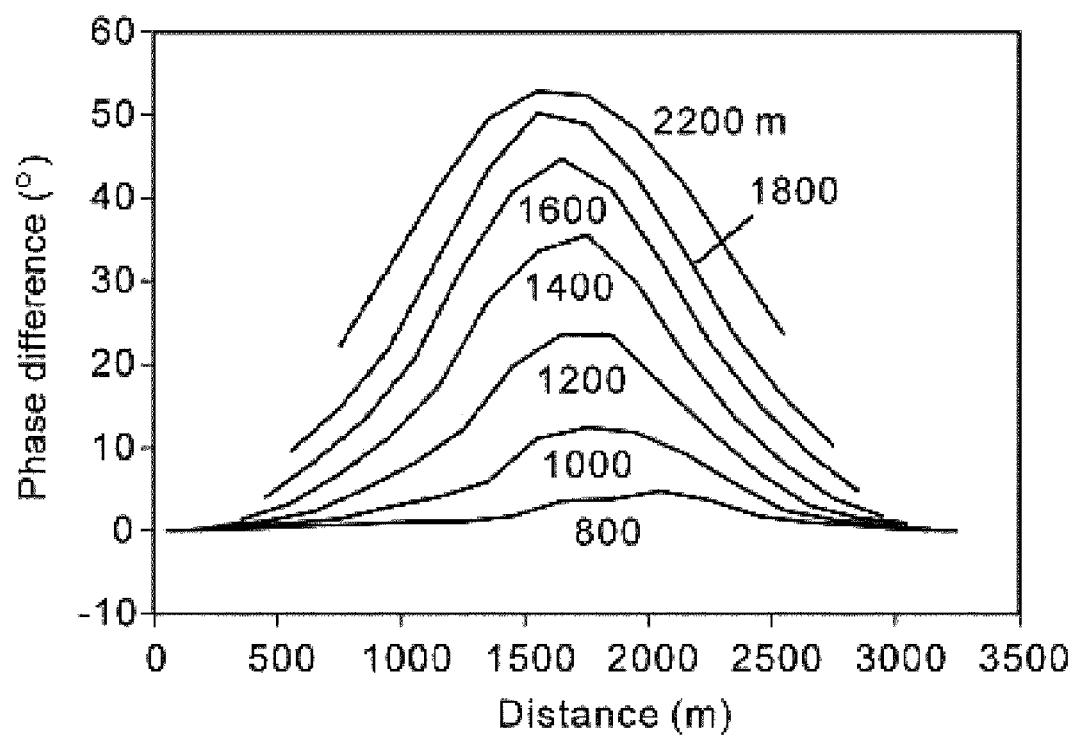
Figure 11:
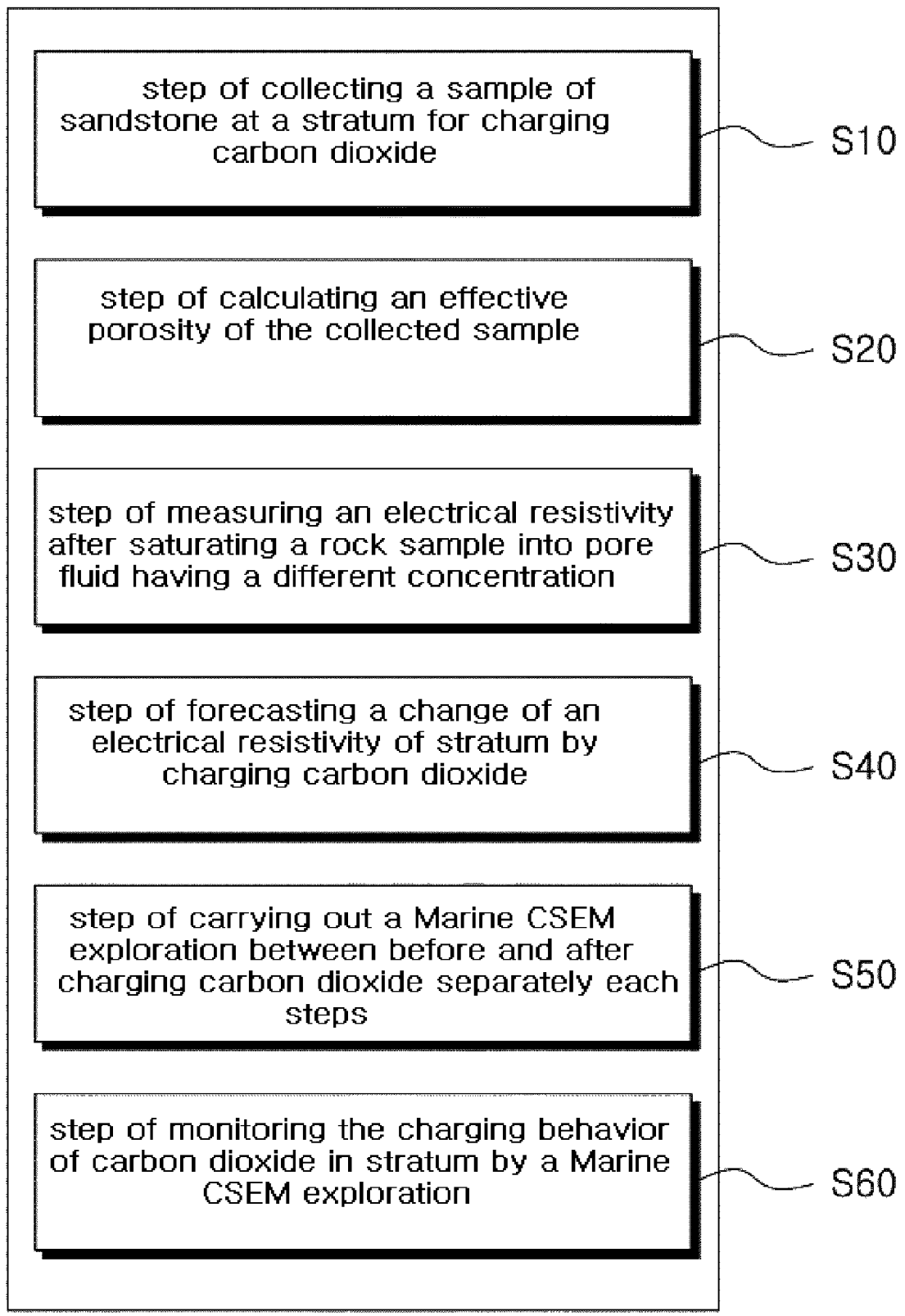
FIG. 11 illustrates each step of a monitoring method according to the present invention.

FIGS. 10A and 10B represent the normalized amplitude and phase difference when $CO_2$ is charged at 30%, and FIGS. 10C and 10D represent the normalized amplitude and the phase difference when $CO_2$ is charged at 50%.

In order to develop a technique of monitoring for storing $CO_2$ in a marine stratum, as the definite embodiment of the present invention, it is carried out to induce Archie's empirical formula from a result of measurement for a indoor electrical resistivity with using a sample of sandstone collected from the bottom of a sea for storing carbon dioxide under ground, and then, based on this, carrying out numerical analysis for a Marine CSEM by setting an inputting value for a simple geological stratum model.

As a result, we can find that the normalized amplitude and the phase difference can be shown largely when 30% and 50% of $CO_2$ is charged into the layer of sandstone regarding a value before charging $CO_2$, and, in a case of 1,600 m offset, the normalized amplitude and the phase difference are represented with a very high value, about 1.6 and 42 respectively, when a 4.25 Hz transmitting frequency is used and $CO_2$ is saturated in the layer of sandstone at 50%.

From the above-mentioned result, it can be mentioned that the effectiveness of monitoring the behavior of carbon dioxide in an aquifer of salt water has been proved.

In storing $CO_2$ under the ground to reduce a greenhouse gas, it is important to develop a technique of monitoring the behavior of $CO_2$ and the electrical resistivity and the seismic wave velocity are being used indoors and at pilot sites. However, there has been no proposed monitoring technique or monitoring method in relation to the storing of $CO_2$ under the marine ground, other then the seismic survey.

The present invention is to develop a monitoring technique for storing $CO_2$ into a marine stratum. In order to achieve the purpose, the present invention induces Archie's empirical formula from a result of measurement on an indoor electrical resistivity with using a sample of sandstone collected at a bottom of a sea, and then carries out, base on the induced formula, a out numerical analysis for a Marine CSEM by setting an inputting value for a simple geological stratum model.

As the result, it has been identified that the normalized amplitude and the phase difference are varied when 30% and 50% of $CO_2$ is charged into the layer of sandstone with regard to a value before charging $CO_2$.

Also, it has been identified that, in a case of 1,600 m of offset (the distance from a transmitter to a receiver), the normalized amplitude and the phase difference have very high values, about 1.6 and 42 respectively, when 4.25 Hz of transmitting frequency is used and $CO_2$ is saturated in the layer of sandstone at 50%.

From the above-mentioned result, it has been proved that the Marine CSEM according to the present invention can be used as a technique of monitoring a behavior of $CO_2$ since it is possible to more exactly construe the $CO_2$ charging area by calculating a rate of change in the amplitude of electric field and a phase difference depending upon a charged amount of $CO_2$ Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of monitoring a behavior of carbon dioxide in a stratum by using a marine Controlled-Sources Electromagnetic survey, the method comprising steps of:
   (a) collecting a sample of sandstone at a stratum for charging carbon dioxide;
   (b) calculating an effective porosity of the collected sample of sandstone;
   (c) measuring an electrical resistivity by saturating the collected sample of sandstone with a pore fluid having a different concentration;
   (d) calculating a change of an electrical resistivity of stratum by charging carbon dioxide;
   (e) carrying out a Marine CSEM exploration before and after charging the carbon dioxide separately in each step; and
   (f) monitoring a charging behavior of carbon dioxide in stratum by a Marine CSEM exploration.

2. The method according to claim 1, wherein a system for measuring of the electrical resistivity in step (c) comprises;
   a function generator to flow an electric current;
   a signal conditioner to measure a potential difference;
   a data processor to calculate an electrical resistivity from the electric current and the potential difference; and
   a measuring vessel.

3. The method according to claim 1, wherein the forecasting of the change of the electrical resistivity by charging carbon dioxide in step (d) is achieved by calculating experimental integer a, and cementation factor m, by using Archie's empirical formula defined by $$R = FR_w S_w^{-2}, F = \frac{R}{R_w} = a\Phi^{-m},$$

which is induced from a result of measurement for the electrical resistivity of the collected sample of sandstone, wherein, R is the electrical resistivity of the collected sample of sandstone, Sw is a degree of water saturation, $\phi$ is porosity, and wherein a value for integer a and cementation factor m is obtained by an intercept and a slope of the a linear function of a regressive curve from correlation graph for conductivity (an inverse of an electrical resistivity) of the collected sample of sandstone and conductivity of the pore fluid measured in step (c).

4. The method according to claim 1, wherein the monitoring of the behavior of carbon dioxide in step (f) is achieved by, based on a fact that, when carbon dioxide is charged into the determined stratum, an amplitude and a phase difference of an electric field at a charged area are changed, calculating the amplitude and the phase difference of an electric field of stratum before and after the carbon dioxide is charged, and monitoring a behavior of the carbon dioxide in the stratum after the carbon dioxide is charged.

* * * * *